United States Patent [19]

Perlmutter

[11] Patent Number: 5,166,949
[45] Date of Patent: Nov. 24, 1992

[54] METHOD AND APPARATUS FOR SUPPRESSING OFF-AXIS MODES IN LASER AND RING LASER GYROSCOPES

[75] Inventor: Michael S. Perlmutter, Sherborn, Mass.

[73] Assignee: Northrop Corporation, Hawthorne, Calif.

[21] Appl. No.: 631,592

[22] Filed: Dec. 20, 1990

[51] Int. Cl.⁵ .............................................. H01S 3/083
[52] U.S. Cl. ...................................... 372/94; 372/19; 372/29; 356/350
[58] Field of Search ...................... 372/94, 19; 356/350

[56] References Cited

U.S. PATENT DOCUMENTS

| | | | |
|---|---|---|---|
| 3,323,411 | 6/1967 | Killpatrick | 372/94 |
| 4,110,045 | 8/1978 | Smith, Jr. et al. | 372/92 |
| 4,519,708 | 5/1985 | Perlmutter | 372/94 |
| 4,627,732 | 12/1986 | Perlmutter | 372/94 |

Primary Examiner—Léon Scott, Jr.
Attorney, Agent, or Firm—Terry J. Anderson; Robert B. Block; Karl J. Hoch, Jr.

[57] ABSTRACT

A dielectric interference film having a central region of one thickness and a peripheral region of a different thickness is superimposed on one of the mirrors of a ring laser gyroscope for the purpose of suppressing off-axis resonant modes that are characteristic of a resonant cavity. The central region is designed to intercept a large portion of the fundamental mode power and a lesser portion of the off-axis mode power. The difference in thickness between the central and peripheral regions causes the reflected light from the two regions to differ in phase by approximately one-half wavelength and destructively interfere. As a result of the imbalance of the fundamental and off-axis mode powers incident on the central region, the reflectivity losses of the off-axis modes are more pronounced than those of the fundamental mode with the result that the off-axis modes are completely suppressed.

20 Claims, 3 Drawing Sheets

METHOD AND APPARATUS FOR SUPPRESSING OFF-AXIS MODES IN LASER AND RING LASER GYROSCOPES

BACKGROUND OF THE INVENTION

This invention relates to lasers and to laser gyroscopes and the techniques for suppressing off-axis resonant modes which can interfere with the proper operation of such devices.

Light waves traveling a closed optical path on a rotating platform experience an apparent shift in frequency which is proportional to the angular velocity of the platform. The sign of the frequency shift is determined by the sense of the platform rotation relative to the direction of propagation. The frequency shifts of light waves traveling in opposite directions around the same closed path will thus be the same in magnitude and opposite in sign with the result that the difference in frequency of the counter-propagating waves is a measure of the angular velocity of the platform. This phenomenon provides the basis for a ring laser gyroscope, a device for determining the rotational speed of a platform from the difference in frequency of light waves propagating in opposite directions along a closed optical path.

Counter-propagating light waves for a ring laser gyro are established in a resonant cavity which includes a number of mirrors so arranged as to cause light waves to travel in closed paths around the cavity. Such a resonant cavity generally supports a large number of resonant modes of propagation where each resonant mode is characterized by a particular frequency and a particular distribution of power in planes transverse to the propagation path. The fundamental resonant mode has a concentration of power in the central region near the axis of the transverse plane while other higher-order resonant modes have concentrations of power that extend into peripheral or off-axis regions. These off-axis modes have slightly different frequencies than the fundamental mode and their presence degrades the measurement accuracy of the ring laser gyro. For this reason, it is desirable to provide some means of suppressing these off-axis modes thereby leaving only the fundamental mode as the means for sensing platform rotation.

The means for suppressing off-axis modes resides in the distribution of resonant mode power in the planes transverse to the propagation path. The power associated with the desired fundamental mode is more concentrated in the central region of the transverse plane than is the power associated with the undesired off-axis modes. The use of some kind of aperture can therefore block the propagation of light waves in the peripheral regions of the transverse plane thereby suppressing off-axis modes without disturbing the fundamental mode.

The earliest approaches to off-axis mode suppression capitalized on this idea by incorporating a small aperture in the gyro block during the machining process or utilizing properly-chosen cavity wall dimensions and wall imperfections to obtain the spatial aperturing required to suppress the unwanted modes. These approaches have two major drawbacks: (1) the resulting apertures are not adjustable thereby preventing fine tuning of the gyro once the cavity has been assembled; and (2) scattering of the intercepted light waves occurs, causing an increase in the width of the lock-in bands, an increase in the random drift, an increase in the quantum noise and a variation of the gyro bias. These effects all substantially degrade the performance of a ring laser gyro.

Two more recent mode suppression approaches which seem to eliminate certain of the drawbacks of the above mentioned configurations are described in U.S. Pat. No. 4,627,732 and No. 4,519,708. These patents describe modifications that have been made to the high-reflectivity dielectric mirrors that are typically used in ring laser gyros to reduce the effective reflectivity of the mirrors for off-axis modes.

The modification described in U.S. Pat. No. 4,627,732 is accomplished by exposing the peripheral regions of a mirror to an electron beam and thereby modifying the index of refraction of the alternating high and low index of refraction layers that comprise a dielectric mirror. As a result of the electron beam treatment, interference occurs between the light reflected from the treated and untreated regions of the mirror and the effective reflectivity of the mirror for off-axis modes is reduced.

The modification described in U.S. Pat. No. 4,519,708 is accomplished by depositing an absorptive material on a specific off-axis area of a dielectric mirror. The thickness of the deposited material increases as a function of distance from the mirror axis to minimize scattering effects. Higher-order mode suppression is achieved by absorbing sufficient energy from waves reflected from the coated area to prevent them from lasing. Again, the effective reflectivity of the mirror for the higher-order, off-axis modes is reduced.

Neither the electron beam modification nor the absorptive deposit approach is completely satisfactory. The electron beam modification is complicated and time-consuming to manufacture. The absorptive layer approach is accompanied by undesirable scattering of some amount of incident light energy.

The absorptive layer approach is also complicated to manufacture, in that the thickness of the absorptive material must be varied linearly or quadratically as a function of distance from the axis in order to minimize the scattering effects. There is, therefore, a need for an improved method and apparatus for suppressing higher-order, off-axis modes in ring laser gyros which will overcome the aforementioned difficulties.

SUMMARY OF THE INVENTION

The invention comprises a non-absorbing thin-film dielectric phase aperture device which, when inserted in the propagation path of a ring laser gyro, serves to suppress the off-axis resonant modes of propagation. The device is most effectively employed in combination with some other optical component in a ring laser gyro, for example, one of its mirrors. The invention has as its objectives and achieves the following significant advantages over previous designs: (1) it will suppress off-axis modes without scattering the intercepted light thereby greatly improving gyro performance; (2) it can be physically adjusted in position after gyro assembly; and (3) it eliminates the need for the block aperture, the part of the ring laser gyro block having the tightest dimensional tolerance.

The mode-suppressing characteristics of the off-axis mode suppression arrangement according to the present invention are achieved by the use of an interference layer or film having a thickness in the on-axis central region that differs from the thickness in the outlying peripheral region. The difference in thickness causes light waves which exit from the central region to differ in phase by approximately a half-wavelength from those which exit from the peripheral region. The destructive interference that occurs in the centrally-exiting and the peripherally-exiting waves is more significant for the off-axis modes than it is for the fundamental mode and, as a result, lasing in the fundamental mode occurs, and lasing in the off-axis modes is suppressed.

The phase aperture suppression arrangement according to the present invention can be employed either as part of a transparent optical component where the light passes through the phase aperture and continues on or as part of a mirror where the light passes through the phase aperture, is reflected by the mirror, and then passes through the phase aperture again but in the reverse direction.

The circumferential shape of the phase aperture may be tailored to match the shape of the optical component of which it becomes a part. The surface shape should conform, of course, to the surface of the component to which it is mated.

A key element in the design of a phase aperture suppression arrangement according to the present invention is in determining the location of the boundary between the central and the peripheral regions of the phase aperture. This determination follows from a consideration of the power distributions of the resonant modes for the resonant cavity in a plane transverse to the propagation path and at the point where the phase aperture is to be located. The central region is established by developing a contour which encloses a substantial fraction of the power in the fundamental mode. In accordance with this invention, this fraction is preferably selected to fall in the range from 0.9990 to 0.9999. The off-axis modes will have a significantly lesser amount of power concentrated in the central region and a significantly greater portion in the peripheral region and as a result, light waves propagating in the off-axis modes will experience greater destructive interference than will those propagating in the fundamental mode. If the off-axis mode losses for the selected arrangement are sufficiently high, compared to the fundamental mode loss, the gain of the lasing medium can be established at such a level as to permit the existence of the fundamental mode and to suppress all off-axis modes.

The suppression of off-axis modes can be satisfactorily accomplished over a considerable range of possible central regions. The particular choice may be made on the basis of other considerations. An example of such other considerations will be provided in the description of the preferred embodiment.

DESCRIPTION OF THE PREFERRED EMBODIMENT

Figure 1:
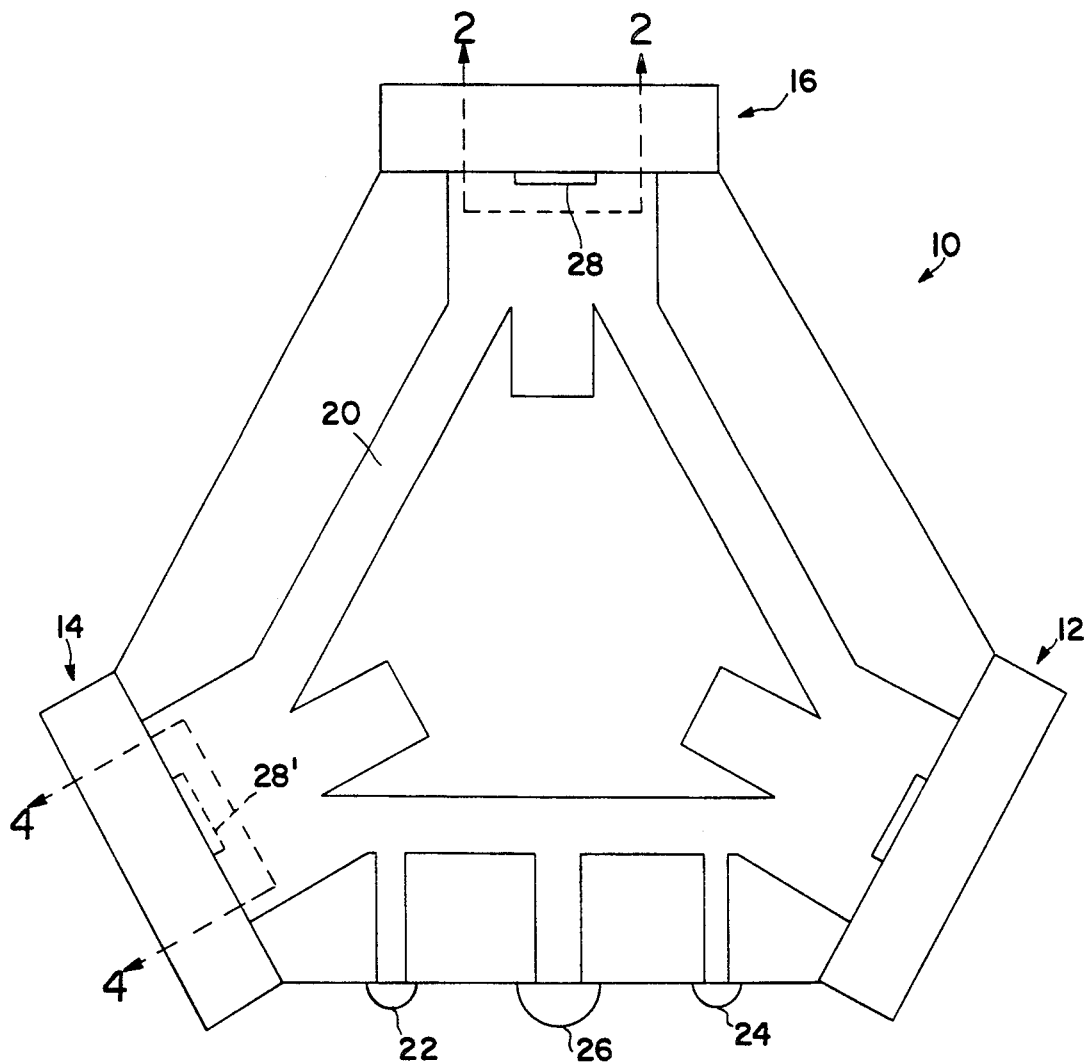
FIG. 1 is a plan view of a three-mirror ring laser gyroscope embodying the invention.

In FIG. 1 is shown a ring laser gyro block 10 designed to support counter-propagating laser light waves traversing a predetermined triangular propagation path. While the invention is described in connection with a triangular ring laser gyro configuration, it will be appreciated that the invention may be incorporated in other ring configurations such as rectangular or pentagonal, for example. Affixed to gyro block 10 at two of the vertices of the triangle are planar mirrors 12 and 14. Affixed to gyro block 10 at the third vertex is spherical mirror 16. The three mirrors 12, 14, and 16 serve to constrain the propagation of light waves within the gyro block 10 to the aforementioned triangular path and define a resonant cavity in the gyro block.

The triangular propagation path is centered more or less in resonant cavity 20 which contains a lasing gas mixture typically composed of helium and neon. A discharge is maintained within a portion of cavity 20 by anodes 22 and 24 and cathode 26 thereby providing a gain medium for generating and maintaining counter-propagating light waves within the cavity.

A phase aperture 28 is affixed to and in intimate and conforming contact with spherical mirror 16 and operates to suppress off-axis, resonant modes of propagation.

Although the object of suppressing off-axis resonant modes could also be achieved by affixing the phase aperture to either of the two planar mirrors 12 and 14, simpler alignment procedures result if the phase aperture is attached to the spherical mirror 16. Phase apertures could, if desired, be attached to all mirrors in the gyro.

In the preferred embodiment mirrors 12, 14, and 16 are dielectric mirrors consisting of alternating high index and low index of refraction dielectric layers. Spherical mirror 16 together with phase aperture 28 are shown in greater detail in FIG. 2 and FIG. 3.

Figure 3:
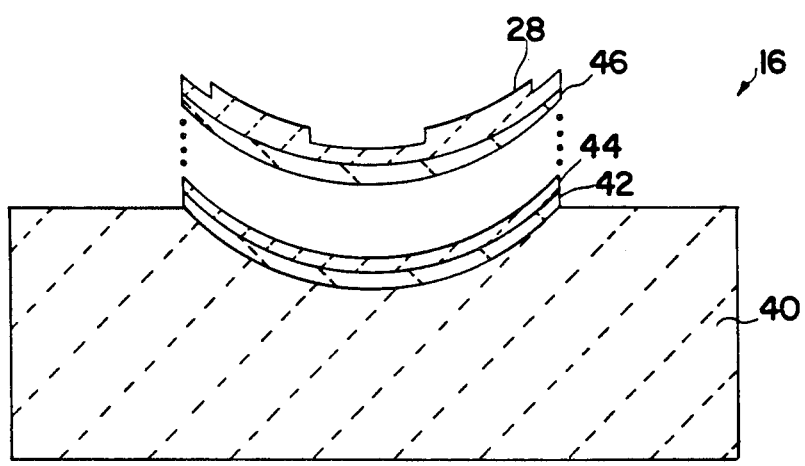
FIG. 3 is a cross-sectional view of a phase aperture according to the present invention in combination with a spherical dielectric mirror taken along the lines 3—3 of FIG. 2.

Mirror substrate 40 shown in FIG. 3 comprises a material with a low index of refraction such as fused silica having a spherical depression. A first spherical mirror layer 42 and subsequent odd-numbered spherical mirror layers of the dielectric mirror are a high index of refraction material such as titanium dioxide ($TiO_2$), for example, which has a refractive index of about 2.35 at a wavelength of 1.15 $\mu$m. A second layer 44 and subsequent even-numbered layers are a low index of refraction material such as silicon dioxide ($SiO_2$), for example, which has a refractive index of about 1.46 at a wavelength of 1.15 $\mu$m.

For maximum reflectivity for a given number of layers, an odd number of layers is preferred so that the stack of layers in the present instance would terminate with layer 46, the high index of refraction material $TiO_2$.

Figure 2:
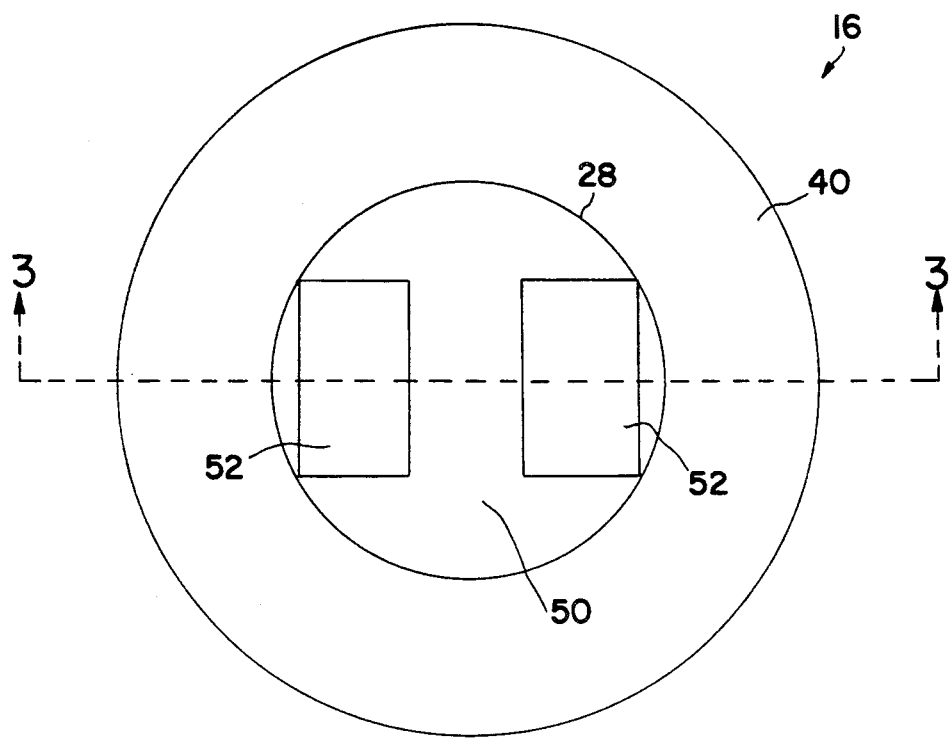
FIG. 2 is a plan view of a phase aperture according to the present invention in combination with a spherical dielectric mirror taken along the lines 2—2 of FIG. 1.

Phase aperture 28 is fabricated from the same low index of refraction material used for the even layers of the dielectric mirror. The phase aperture-mirror combination is shown in FIG. 2. It includes a central region 50 having one thickness and a peripheral region 52 having a different thickness where the difference in thicknesses between the two regions is such that light waves reflected from the central region will differ in phase from those reflected from the peripheral region by a half wavelength ideally but may be substantially less. The lower limit of this phase difference for phase aperture suppression of the off-axis modes is believed to be in the vicinity of one-sixteenth wavelength. The difference in thickness between the two regions can readily be calculated from Fresnel's equations given the index of refraction of the phase aperture material, the polarization of the light waves, and the angle of incidence.

The boundary of the central region is chosen such that a large fraction (typically 0.9998) of the fundamental mode power is incident on the central region 50. Consequently, the destructive interference that occurs in light waves reflected from the central region 50 and those reflected from the peripheral region 52 results in an effective mirror reflectivity for the fundamental mode that is only slightly less than the mirror reflectivity in the absence of the phase aperture. The effective reflectivities for off-axis modes are somewhat smaller since the powers of the off-axis modes are less concentrated in the central region 50 than is the power of the fundamental mode. As a result, for the preferred embodiment of a ring laser gyro described herein, the phase aperture imparts about eight times the optical loss for the first off-axis mode and even higher losses for the higher-order modes as compared to the fundamental mode.

If the boundary of the central region 50 is properly chosen, the optical loss experienced by the fundamental mode is insufficient to prevent the fundamental mode from lasing. However, the larger optical loss for the off-axis modes is sufficient to prevent the off-axis modes from lasing. Thus, the phase aperture, by its quantitatively different effects on effective mirror reflectivity for fundamental and off-axis resonant modes, achieves off-axis mode suppression.

The precise boundary between central and peripheral regions must be determined for each application in accordance with the following principles. The central region must be sufficiently large that the inherent wandering of the optical beam that results from environmental temperature changes does not excessively modulate the effective reflectivity of the mirror for the fundamental mode and thereby unnecessarily increase the measurement errors of the optical system. On the other hand, the central region cannot be so large as to prevent effective discrimination between fundamental and off-axis modes by a change in effective mirror reflectivity. Ideally, the central region boundary should be reduced to the point where measurement errors of the optical system begin to increase substantially. In the preferred embodiment, this point corresponds to the situation where only a few hundred parts per million of fundamental mode power is reflected from the peripheral region of the phase aperture.

It is immaterial as to whether the central region is thicker or thinner than the peripheral region. The absolute thickness of the thinner region is also immaterial insofar as the suppression of off-axis modes is concerned. For some applications it may be desirable to have the thickness of either the central or the peripheral region equal to zero. Where the phase aperture can perform an additional function unrelated to off-axis mode suppression, it may be desirable to have the minimum thickness of the phase aperture equal or exceed a certain value.

For example, the phase aperture might be designed to have some minimum thickness which would serve to protect the top layer of the dielectric mirror to which it is attached from the deleterious effects of ultraviolet light produced by the helium-neon gas discharge. It is the present practice to place a half-wavelength thick layer of low index of refraction material over the dielectric mirror to minimize the formation of color centers in the exposed high index of refraction layer of the mirror as a result of the ultraviolet radiation emitted from the excited helium-neon gas discharge. The additional half-wave layer does not change the reflectivity of the mirror, but absorbs the ultraviolet radiation without affecting the absorption of the mirror at the lasing frequency. If the phase aperture has a minimum thickness sufficient to absorb the ultraviolet rays, it too can perform this shielding function and the extra half-wave layer becomes unnecessary.

The boundary between central and peripheral regions may be shaped in such a way as to achieve other purposes in addition to the principal purpose of off-axis mode suppression. In the embodiment illustrated in connection with FIG. 2 and FIG. 3, a shape is chosen which in practice simplifies ring laser gyro alignment.

In accordance with the present invention, at least two alignment requirements are provided: (1) the light beam is constrained to a planar path; and, (2) the phase aperture is aligned with the beam. Both of these requirements can be readily and efficiently satisfied by proper adjustments of the spherical mirror of FIG. 2 and FIG. 3.

An out-of-plane tilt of either planar mirror 12 or 14 in FIG. 1 as a result of manufacturing tolerances will cause out-of-plane beam displacements. An adjustment of spherical mirror 16 in the direction normal to the plane of the propagation path will compensate for such tilts. Phase aperture 28 can be aligned with the beam by adjustments of spherical mirror 16 in the direction corresponding to the intersection of the plane of the propagation path and the mirror substrate.

The advantage of the specific boundaries between central region 50 and peripheral region 52 shown in FIG. 2 is further illustrated in that movement of spherical mirror 16 transverse to the plane of propagation for purposes of beam alignment will have minimal effect on off-axis mode suppression since the boundaries between central region 50 and peripheral region 52 are also transverse to the plane of propagation.

Figure 4:
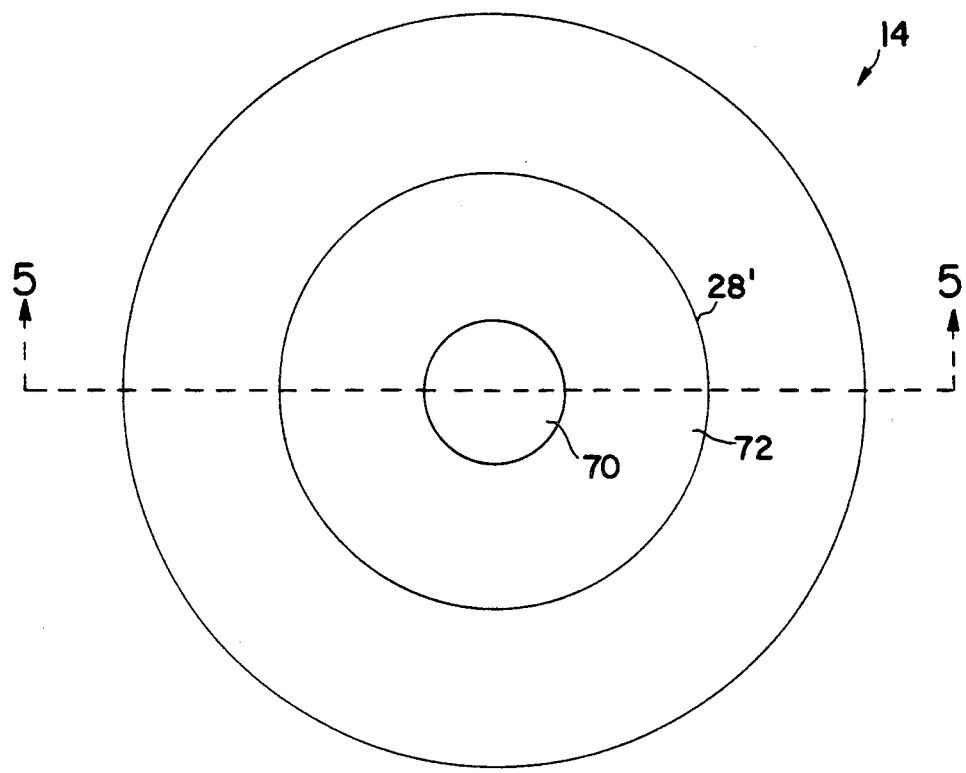
FIG. 4 is a plan view of a phase aperture according to the present invention in combination with a planar dielectric mirror taken along the lines 4—4 of FIG. 1.
Figure 5:
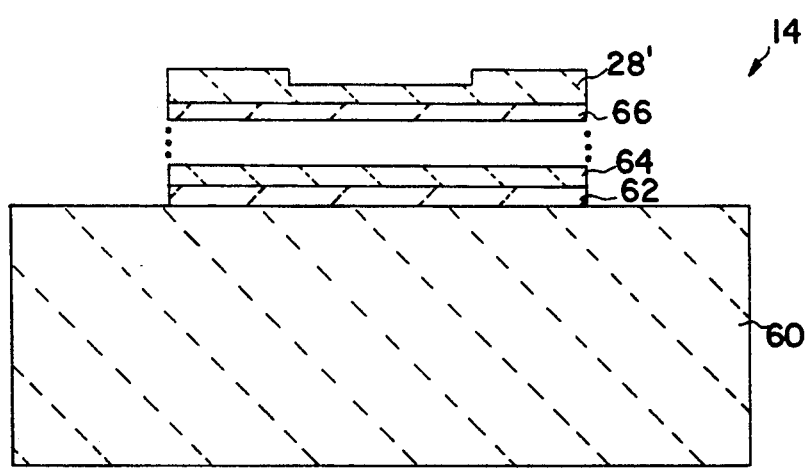
FIG. 5 is a cross-sectional view of a phase aperture according to the present invention in combination with a planar dielectric mirror taken along the lines 5—5 of FIG. 4.

The combination of the phase aperture with the spherical mirror has the very significant advantage of permitting the alignment process to be accomplished by the adjustment in position of a single component. However, there may be situations where it is desirable to accomplish phase aperture alignment separately from beam alignment. To achieve this separation of functions, the phase aperture 28' shown as a dashed outline affixed to planar mirror 14 in FIG. 1 would be substituted for phase aperture 28 shown affixed to spherical mirror 16. The details of the phase aperture and planar mirror combination are shown in FIG. 4 and FIG. 5. The section view identified in FIG. 4 is shown in FIG. 5.

Planar mirror 14 is comprised of substrate 60 of low index of refraction material and first planar mirror layer 62, second planar mirror layer 64, and succeeding layers up to and including last planar mirror layer 66 of alternating high index and low index of refraction materials as previously described in connection with the spherical mirror of FIG. 2 and FIG. 3. As will be appreciated the surface of substrate 60 to which subsequent layers conform is according to this embodiment a planar surface.

Phase aperture 28' is a planar layer of low index of refraction material in intimate contact with final planar mirror layer 66 of the mirror. The plan view of the phase aperture-mirror combination according to this embodiment is shown in FIG. 4. Central region 70 is designed to intercept a very large fraction of the incident fundamental mode power in accordance with the guidelines given previously. Since the planar mirror need only be adjusted in the direction corresponding to the intersection of the mirror plane and the plane of the propagation path to align the phase aperture with the beam, a circular shape is selected for central region 70 and an annular shape extending thereabout is selected for peripheral region 72.

The phase aperture may be fabricated as a thin film having two discrete thicknesses and intended to be part of some other necessary optical element. Its fabrication can best be accomplished by using the same techniques and technologies that are employed in making dielectric mirrors and other thin film devices by electron beam evaporation, sputtering, or other equivalent techniques.

When the phase aperture is to become part of a dielectric mirror, the fabrication of the phase aperture can be part of the overall process in the fabrication of the mirror. For example, after the layers comprising the mirror have been deposited, a phase aperture layer of specified thickness can be laid down according to the same process. With such approach a mask of the central region of the phase aperture is superimposed on the phase aperture layer and additional deposition is made until the difference in thicknesses between the central and peripheral regions reaches the desired value.

An alternative approach would be to mask the central region as just described and then remove material from the peripheral region by means of an ion beam until the desired difference in thickness is achieved. In some situations it may be more convenient to mask the peripheral region rather than the central region. Still another fabrication possibility is to lay down the phase aperture layer as described above and then to use photoresist masking techniques and chemical processes for removing the excess material.

Although phase aperture 28 is attached to spherical mirror 16 in the preferred embodiment shown in FIG. 1, FIG. 2, and FIG. 3, it would perform the off-axis mode suppression function equally well if it were attached to either of the two planar mirrors 12 and 14. The phase aperture may also be attached to transmissive optical devices such as Faraday rotators that are utilized in certain ring laser gyro configurations.

As will be appreciated by those skilled in the art, the utility of a phase aperture of the type described herein is not limited to ring laser gyros having three-mirror configurations. It may also be usefully employed in ring laser gyros based on configurations of more than three mirrors. In fact, the utility of the phase aperture herein described is not limited to ring laser gyros. It may also be used for suppressing undesired resonant modes in any laser or other optical system where the propagation of light waves is constrained to discrete resonant modes.

The combination of the phase aperture with some other necessary reflective or transmissive optical device will usually be both economically and technically advantageous. However, the phase aperture may also be designed as a separate optical element and placed at an appropriate point in the propagation path of the ring laser gyro or other optical system.

There are numerous options available as to the phase aperture material. The selection of a material logically follows from the nature of the optical component to which the phase aperture is to be affixed. The objective should be to choose a material which will best accommodate the integration of the optical component and the phase aperture without incurring any penalties in the performance of either. In most instances, this objective will be achievable.

While the invention has been particularly shown and described with respect to presently preferred embodiments thereof, it will be understood by those skilled in the art that changes in form and details may be made therein without departing from the scope and spirit of the invention.

What is claimed is:

1. In a laser having mirrors for defining a resonant optical cavity for the propagation of a laser light beam excited in particular on-axis and off-axis modes of oscillation, and for guiding said beam along a particular path in said cavity, means for suppressing off-axis modes of said beam, the improvement comprising:

means forming a phase aperture comprising an interference film having a central region and at least one spatially separate peripheral region, said regions being contiguous at a common boundary;

said central region having a first thickness and said peripheral region having a second thickness different from said first thickness, the propagation of light waves of said beam through said central region altering the phase of said waves by a first amount and the propagation of said waves through said peripheral region altering the phase of said waves by a second amount different from said first amount, said waves propagating through said central region interfering with and suppressing said waves propagating through said peripheral region; and, means for mounting said phase aperture of said beam at a location where said on-axis and off-axis modes are present and segregated so that said on-axis modes of said beam propagate through said central region of said phase aperture and said off-axis modes propagate through said peripheral region of said phase aperture.

2. The laser of claim 1 wherein the difference in thickness between said regions of said phase aperture is sufficiently large such that the difference in phase between light waves of said beam propagating through said central region and light waves of said beam propagating through said peripheral region is between one-sixteenth and fifteen-sixteenths wavelength and ideally one-half wavelength of said beam.

3. The laser of claim 2 wherein said central region is sufficiently large such that said central region intercepts a greater fraction of the power of a fundamental resonant mode incident on said phase aperture than it does of off-axis resonant mode which are so incident.

4. The laser of claim 3 wherein of said central region is sufficiently large such that light beam wandering resulting from environmental temperature variations does not excessively modulate the reflectivity of a said mirror for said fundamental resonant mode such as to adversely affect the performance of said laser, said central region being not so large as to impair said off-axis mode suppression properties of said phase aperture.

5. The laser of claim 4 wherein said central region is sufficiently large such that said central region intercepts at least 0.9990 of said fundamental resonant mode power incident on said phase aperture.

6. The laser of claim 5 wherein said phase aperture is in intimate and conforming contact with a surface of a said mirror of said laser through which said surface light waves of said beam enter and exit said mirror.

7. The laser of claim 6 wherein said mirror in combination with said phase aperture is a planar mirror.

8. The laser of claim 7 wherein said mirror is adjustably disposed in said laser such that adjustment of said mirror translates said combination of planar mirror and phase aperture in a direction parallel to an intersection of a plane of said planar mirror and a plane of said propagation path of said beam, said central region having a shape such that said translation aligns said phase aperture with said beam for maximum suppression of said off-axis modes.

9. The laser of claim 6 wherein said mirror in combination with said phase aperture is a spherical mirror.

10. The laser of claim 9 wherein said mirror is adjustably disposed in said laser such that adjustment of said mirror translates said combination of spherical mirror and phase aperture in a direction normal to a plane of said propagation path of said beam, said peripheral region having a shape such that said translation constrains said beam to a particular propagation path and has minimal effect on said fractions of fundamental and off-axis resonant mode powers incident on said central and peripheral regions of said phase aperture.

11. The laser of claim 10 wherein said laser is a ring laser gyroscope and said path is a closed path.

12. The laser of claim 8 wherein said laser is a ring laser gyroscope and said path is a closed path.

13. An improved ring laser gyroscope wherein a plurality of mirrors are disposed to direct counter-propagating light waves along a closed propagation path, the improvement comprising the combination of one of said mirrors and a phase aperture for suppressing off-axis resonant modes which otherwise detract from the performance of the ring laser gyroscope, including,
　a mirror substrate having a low index of refraction,
　a shaped surface formed in said substrate for positioning in the light path of said ring laser gyro,
　a plurality of non-absorbing dielectric layers superimposed on said substrate in said shaped surface for reflecting said light waves along said propagation path, said layers comprising an odd number of alternating layers of a high index of refraction material and a low index of refraction material, the first layer of said alternating layers that is in contact with said substrate being said high index of refraction material,
　a phase aperture comprising a layer of said low index of refraction material superimposed on said alternating layers, said phase aperture layer having a central region of one thickness and a peripheral region of a different thickness, said regions being contiguous at a common boundary, said difference in thicknesses of said regions causing said light waves propagated through said central region to have a phase different from the phase of and interfere with light waves propagated through said peripheral region, said central region being so defined as to intercept a higher fraction of fundamental resonant mode power incident on said phase aperture than it does off-axis resonant mode power.

14. The ring laser gyroscope of claim 13 wherein said central region is sufficiently large such that light beam wandering resulting from environmental temperature variations does not excessively modulate the reflectivity of a said mirror for said fundamental resonant mode such as to adversely affect the performance of said ring laser gyroscope, said central region being not so large as to impair said off-axis mode suppression properties of said phase aperture.

15. The ring laser gyroscope of claim 14 wherein said central region of said phase aperture is sufficiently large such that said central region intercepts at least 0.9990 of said fundamental mode resonant beam power incident on said phase aperture.

16. The ring laser gyroscope of claim 15 wherein said mirror in combination with said phase aperture is a planar mirror.

17. The ring laser gyroscope of claim 16 wherein said mirror is adjustably disposed in said ring laser gyroscope such that adjustment of said mirror translates said combination of mirror and phase aperture in a direction parallel to an intersection of a plane of said planar mirror and a plane of said propagation path of said beam, said central region having a shape such that said translation aligns said phase aperture with said beam for maximum suppression of said off-axis modes.

18. The ring laser gyroscope of claim 15 wherein said mirror in combination with said phase aperture is a spherical mirror.

19. The ring laser gyroscope of claim 18 wherein said mirror is adjustably disposed in said ring laser gyroscope such that adjustment of said mirror translates said combination of mirror and phase aperture in a direction normal to a plane of said closed propagation path, said peripheral region having a shape such that such translation constrains said beam to a particular propagation path and has minimal effect on said fractions of fundamental and off-axis resonant mode powers incident on said central and peripheral regions of said phase aperture.

20. The method of suppressing off-axis modes of light waves propagating in a cavity comprising the steps of:
　producing and maintaining light waves propagating in resonant modes within a resonant cavity;
　constraining said waves to propagate through a bounded surface, said bounded surface comprising a central region and a peripheral region of different thicknesses, said regions being contiguous at a common boundary; and,
　shifting the phase of said light waves propagating through said bounded surface from said central region relative to the phase of said light waves propagating through said peripheral region.

* * * * *